US012261375B2

(12) United States Patent
Hojjat et al.

(10) Patent No.: US 12,261,375 B2
(45) Date of Patent: Mar. 25, 2025

(54) BEAM BASED BEAMFORMERS FOR PROVIDING HIGH GAIN BEAMS IN 8T8R DUAL POLARIZED BEAMFORMERS

(71) Applicant: Communication Components Antenna Inc., Kanata (CA)

(72) Inventors: Nasrin Hojjat, Ottawa (CA); Lin-Ping Shen, Ontario (CA); Rod Batterton, Ontario (CA)

(73) Assignee: Communication Components Antenna Inc., Kanata (CA)

( * ) Notice: Subject to any disclaimer, the term of this patent is extended or adjusted under 35 U.S.C. 154(b) by 329 days.

(21) Appl. No.: 17/859,191

(22) Filed: Jul. 7, 2022

(65) Prior Publication Data

US 2024/0014552 A1 Jan. 11, 2024

(51) Int. Cl.

*H01Q 3/36* (2006.01)
*H01Q 3/26* (2006.01)
*H01Q 1/24* (2006.01)
*H01Q 19/10* (2006.01)

(52) U.S. Cl.

CPC ................. *H01Q 3/36* (2013.01); *H01Q 3/26* (2013.01); *H01Q 3/267* (2013.01); *H01Q 1/246* (2013.01); *H01Q 19/10* (2013.01)

(58) Field of Classification Search

CPC ............ H01Q 3/36; H01Q 3/267; H01Q 3/00; H01Q 3/26

USPC .................................................. 342/371, 372

See application file for complete search history.

(56) References Cited

U.S. PATENT DOCUMENTS

| | | | | |
|---|---|---|---|---|
| 10,367,256 B2 * | 7/2019 | Edenfield | ................. | H01Q 3/34 |
| 10,770,790 B1 * | 9/2020 | Mahanfar | ................ | H01Q 3/34 |
| 11,133,586 B2 * | 9/2021 | Shen | .................... | H01Q 21/061 |
| 11,205,852 B2 * | 12/2021 | Wu | ........................ | H01Q 1/405 |
| 11,239,553 B2 * | 2/2022 | Mahanfar | .............. | H01Q 21/20 |
| 11,515,622 B2 * | 11/2022 | Hou | ......................... | H01Q 3/30 |
| 11,621,755 B2 * | 4/2023 | Wu | .......................... | H01Q 3/40 375/267 |
| 11,894,892 B2 * | 2/2024 | Junttila | .................. | H01Q 1/246 |
| 2020/0028260 A1 * | 1/2020 | Achour | ................. | G01S 13/426 |
| 2020/0333431 A1 * | 10/2020 | Völkel | ................... | G01S 13/426 |

(Continued)

FOREIGN PATENT DOCUMENTS

| | | | | |
|---|---|---|---|---|
| CN | 110416706 B * | 7/2023 | ............. | G01R 29/10 |
| WO | WO-2023091876 A1 * | 5/2023 | ............. | H01Q 21/06 |

*Primary Examiner* — Chuong P Nguyen

(74) *Attorney, Agent, or Firm* — Sofer & Haroun, LLP

(57) ABSTRACT

A cellular beamforming base station antenna is provided having a reflector, a plurality of signal ports located at the bottom of said reflector, a calibration circuit, a plurality of beamformers, coupled to the signal ports, and a plurality of radiating elements, coupled to the beamformers. The plurality of radiating elements are arranged into a plurality of vertically aligned columns disposed across a width of the reflector, the plurality of radiating elements are each also positioned in one of a plurality of horizontally aligned rows along the length of the reflector. Elements in one of the plurality of rows of elements are connected to at least a first of the plurality of beamformers. Elements in another of the plurality of rows of elements are connected to a second of the plurality of beamformers. Outputs of the first and second beamformers are connected to the calibration circuit which is connected to different ports located on a bottom of the reflector.

18 Claims, 22 Drawing Sheets

(56) References Cited

U.S. PATENT DOCUMENTS

| | | | | |
|---|---|---|---|---|
| 2023/0082093 | A1* | 3/2023 | Pollayi | H01Q 3/267<br>343/835 |
| 2023/0299469 | A1* | 9/2023 | Kasani | H01Q 21/0025<br>343/835 |
| 2023/0395974 | A1* | 12/2023 | Shen | H01Q 21/0075 |
| 2024/0145905 | A1* | 5/2024 | Lindmark | H01Q 5/42 |
| 2024/0291137 | A1* | 8/2024 | Kasani | H01Q 3/36 |

* cited by examiner

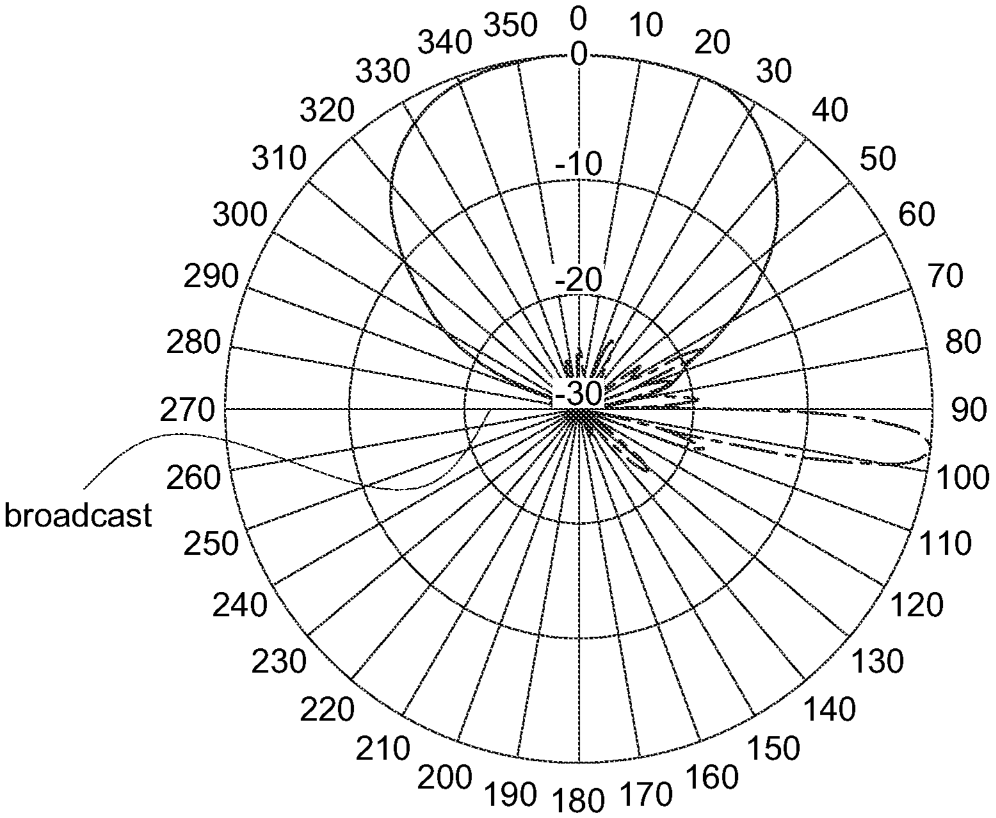
FIG. 2B1
(PRIOR ART)

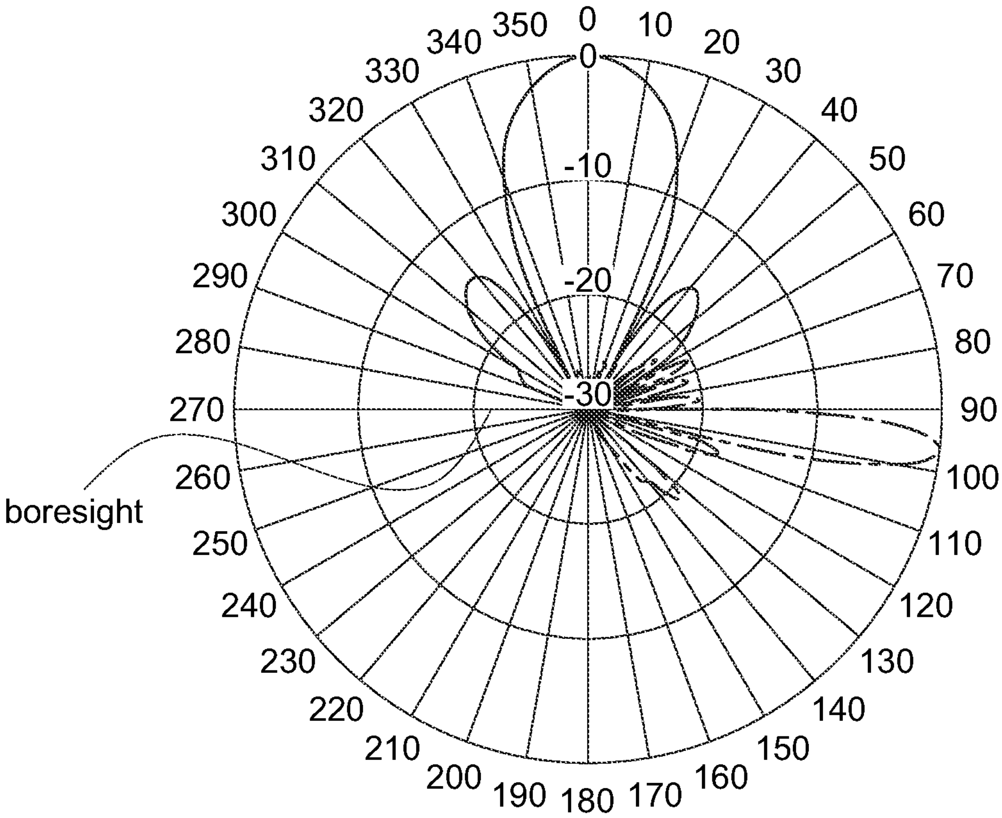
FIG. 2B2
(PRIOR ART)

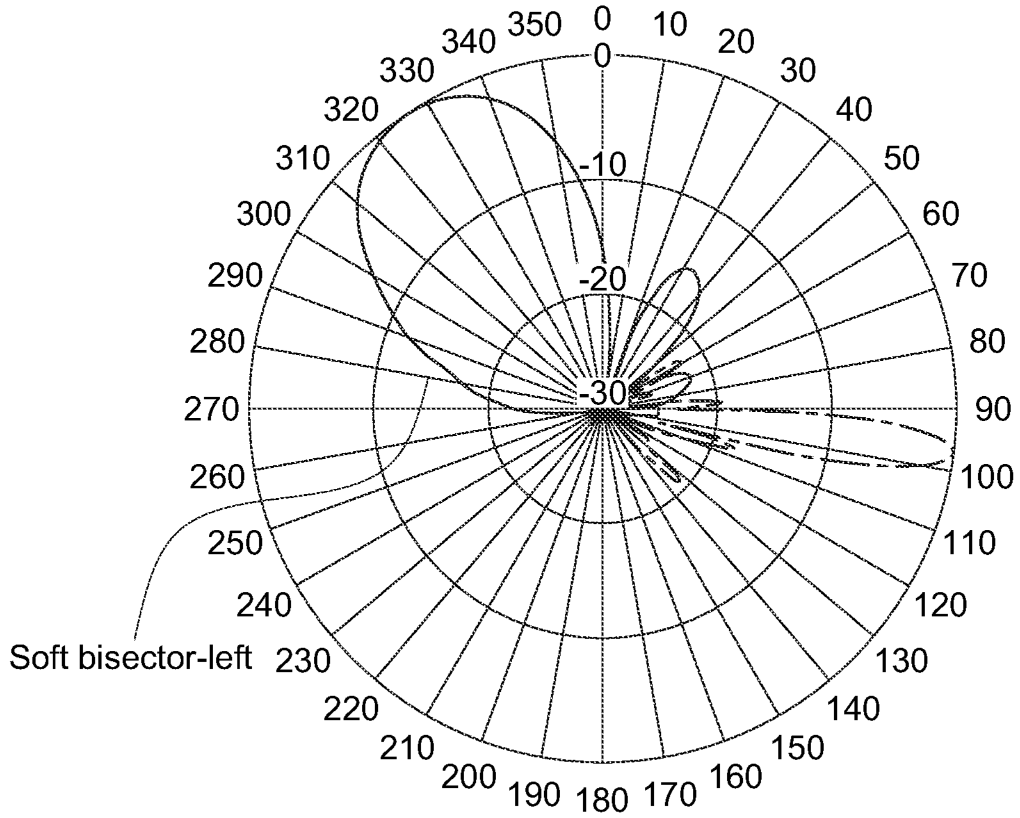
FIG. 2B3
(PRIOR ART)

Bore sight +/- Broadside +/- Soft split +/- (R and L)

| | | port1 +45-L2 | port2 -45-L1 | port3 +45-L1 | port4 -45-L1 | port5 +45-R1 | port6 -45-R1 | port7 +45-R2 | port8 -45-R2 |
|---|---|---|---|---|---|---|---|---|---|
| Broadside(+45) | Amp(V) | 1 | 0 | 1 | 0 | 1.1 | 0 | 1.15 | 0 |
| | Phase(deg) | 45 | 0 | 0 | 0 | -60 | 0 | 35 | 0 |
| Boresight service(+45) | Amp(V) | 0.1 | 0 | 1 | 0 | 1 | 0 | 0.1 | 0 |
| | Phase(deg) | 0 | 0 | 0 | 0 | 0 | 0 | -130 | 0 |
| Soft split-R (25deg,+45) | Amp(V) | 0 | 0 | 0.19 | 0 | 0.93 | 0 | 1 | 0 |
| | Phase(deg) | 0 | 0 | -10 | 0 | 0 | 0 | 125 | 0 |
| Soft split-L (25deg,+45) | Amp(V) | 1 | 0 | 0.93 | 0 | 0.19 | 0 | 0 | 0 |
| | Phase(deg) | 0 | 0 | 20 | 0 | 0 | 0 | 0 | 0 |
| Broadside(-45) | Amp(V) | 0 | 1 | 0 | 1 | 0 | 1.1 | 0 | 1.15 |
| | Phase(deg) | 0 | 45 | 0 | 0 | 0 | -60 | 0 | 35 |
| Boresight service(-45) | Amp(V) | 0 | 0.1 | 0 | 1 | 0 | 1 | 0 | 0.1 |
| | Phase(deg) | 0 | 0 | 0 | 0 | 0 | 0 | 0 | -130 |
| Soft split-R (25deg,-45) | Amp(V) | 0 | 0 | 0 | 0.19 | 0 | 0.93 | 0 | 1 |
| | Phase(deg) | 0 | 0 | 0 | -10 | 0 | 0 | 0 | 125 |
| Soft split-L (25deg,-45) | Amp(V) | 0 | 1 | 0 | 0.93 | 0 | 0.19 | 0 | 0 |
| | Phase(deg) | 0 | 0 | 0 | 20 | 0 | 0 | 0 | 0 |

B

FIG. 8

B

| | | | | | | | | | |
|---|---|---|---|---|---|---|---|---|---|
| Beam1 (29 left) +45 | Amp(V)<br>Phase(deg) | 1 | 0 | 0 | 0 | 0 | 0 | 0 | 0 |
| Beam2 (10 left) +45 | Amp(V)<br>Phase(deg) | 0 | 0 | 1 | 0 | 0 | 0 | 0 | 0 |
| Beam3 (10 right) +45 | Amp(V)<br>Phase(deg) | 0 | 0 | 0 | 0 | 1 | 0 | 0 | 0 |
| Beam4 (29 right) +45 | Amp(V)<br>Phase(deg) | 0 | 0 | 0 | 0 | 0 | 0 | 1 | 0 |
| Beam1 (29 left) -45 | Amp(V)<br>Phase(deg) | 0 | 1 | 0 | 0 | 0 | 0 | 0 | 0 |
| Beam2 (10 left) -45 | Amp(V)<br>Phase(deg) | 0 | 0 | 0 | 1 | 0 | 0 | 0 | 0 |
| Beam3 (10 right) -45 | Amp(V)<br>Phase(deg) | 0 | 0 | 0 | 0 | 0 | 1 | 0 | 0 |
| Beam4 (29 right) -45 | Amp(V)<br>Phase(deg) | 0 | 0 | 0 | 0 | 0 | 0 | 0 | 1 |

Zero adjustment narrow beam approach

FIG. 8 (Continued...)

BEAM BASED BEAMFORMERS FOR PROVIDING HIGH GAIN BEAMS IN 8T8R DUAL POLARIZED BEAMFORMERS

FIELD OF THE INVENTION

The present arrangement relates to cellular base station antennas. More particularly, the present arrangement relates to cellular base station beamforming antennas with the capability to produce shaped high gain beams.

DESCRIPTION OF RELATED ART

In the area of cellular base station antennas beamforming relates to a newer generation of base station antennas that are designed in a way that each group of antennas (usually each column and each polarization) has its own RF port. A digital beamformer in baseband applies weighting factors (optimum amplitudes and phases) to the RF signals for each port to shape the beam in the required direction, both in receiving and transmitting modes.

For example, one existing approach using beamformers in cellular antennas is to have an antenna that has a given number of columns in which each column has a plurality of antenna elements. The majority of existing beamforming antennas have four columns of dual polarized elements and therefore there are eight ports connected to the four columns as shown in prior art FIG. 1A (for MIMO and +/−45° polarization). The polarization ports are used for having signal diversity for each shaped beam or alternative to provide for 2×2 MIMO (Multiple Input Multiple Output) arrangement for the antenna. FIG. 1B shows the bottom of the antenna showing the eight signal ports (for +45° and −45° polarized signals) to support the four columns of elements and FIG. 1C is an exemplary image of the antenna of FIG. 1A, illustrating four (4) columns and twelve (12) rows of antenna elements.

In such a traditional antenna, each column is configured to emit a wide pattern in azimuth. See for example prior art FIG. 1D showing a standard wide pattern, usually 70 to 100 degrees. This represents the pattern from the four columns shown in FIG. 1A prior to electronic beamforming applications.

However, as shown in prior art FIGS. 2A and 2B, electronic beamforming is used to produce narrower higher gain patterns from the combined four columns. Moreover, beamforming can be used to steer or direct the combined pattern about 40° to the left or right of 0° as shown in FIG. 2A. It is noted that at any certain time, only one set of weighting factors is applied on the RF signals of the ports and therefore only one of the four (4) beams shown in FIG. 2A can be present at each time instant for each polarization. Therefore, FIG. 2A represents four possible narrow high gain patterns that could be produced using the antenna of FIG. 1A depending on the parameters used in the beamforming. FIGS. 2B1-2B3 are other examples of patterns from the prior art antenna of FIGS. 1A-1C (pattern derived from primary non-beam formed pattern in FIG. 1D showing three beams that commonly are produced beamformers: broadcast beam with about 65 deg beamwidth (FIG. 2B1), boresight beam with about 27 deg beamwidth which is a high gain beam directing at 0 deg azimuth direction (FIG. 2B2) and left side soft bisector beam which directs to −30 deg with about 30 deg beamwidth (FIG. 2B3).

Digital beamformers are typically located in a Remote Radio Unit (RRU) of the base stations and are connected with cables to antenna ports as shown in FIG. 3A, though in some antennas radio unit can be located on the back of the antenna as well. Base station equipment provides the communication signals to the Remote Radio Units.

FIG. 3B shows an exemplary connection cabling between prior art antenna bottom (FIG. 1B) and the RRU (FIG. 3A). The RRU may be used to apply electronic signal weighting factors on the signals of each group of four columns with the same polarization to make a narrower high gain beam. It is known to persons familiar to the art that narrower beamwidths produce higher gains since the area within the covered by the beam is smaller (so greater signal to area ratio for any given signal strength).

The exact shape and beamwidth of the resultant electronically beamformed beams still depends however on the physical spacing between columns of elements which is usually selected as half of wavelength relative to the emitted bandwidth to avoid grating lobes for extreme scan angles. In other words, in extreme scan angles, radiation of columns can add in-phase in another direction in the space (other than the main beam direction) to produce a secondary main lobe. This additional major lobe is called the grating lobe. The formation of this grating lobe in visible space is avoided by using column spacing≤half a wavelength. As such, although electronic beamforming can produce narrower higher gain beams using a four-column architecture, there are limitations on the achievable beamwidth related to the physical spacing of the elements on the antenna.

In summary, in the prior art beamforming approaches, different beam shapes (e.g. FIGS. 2A and 2B) are produced by applying electronic weighting factors (amplitudes and phases) on RF signals which are fed to these wide column patterns (e.g. FIG. 1D—as a basis functions) and therefore the resulting beam (any one of the beams in FIG. 2), at each moment of time, is shaped by a linear superposition of these basic functions. This type of beamforming is referred to as "column based beamformers/beamforming."

As shown in prior art FIGS. 3A and 3B the infrastructure of base station antennas, particularly the radio system in most applications, has only 8 ports and can only support 8T8R. 8T8R is term of art in the industry and refers to an eight-port radio, each of the eight ports for both transmission "T" and receiving "R." One drawback with this prior art antenna/beamformer combinations is that the gain and minimum beamwidths are limited to what can be achieved from the four-column architecture, even with the electronic beamforming. For example, typical prior art four column antennas such as that shown in FIG. 1A can only achieve a minimum azimuth beamwidth of about 24° and the gain cannot exceed 21 dBi.

One potential way to improve gain and decrease the beamwidths would be to increase the number of columns because this would allow for the gain of a shaped beam to increase, and the beamwidth to narrow when the proper weighting factors are applied for each column. However, such a solution in the context of the prior art would increase the number of required antenna ports. This is not particularly feasible because most of the base station radio units (RRU/RF transmitter/receivers that deliver the signals to the ports on the antenna) available for operators only have eight ports. To this end, it is not possible to increase the number of ports more than eight without significant upgrading of the base station equipment.

Even though more ports could be added to the bottom of the antenna (FIG. 1B) to support additional columns, the majority of existing radios in the base station are still eight ports, and upgrading them can be cost prohibitive. As an example, if the number of columns were expanded to an eight columns antenna with dual polarization, using the prior art models, such an antenna would need to have sixteen ports and would also need a sixteen-port base station radio.

OBJECTS AND SUMMARY

The present arrangement looks to overcome the drawbacks associated with the prior art to provide an eight-column beamforming antenna array with improved gain and with improved narrower beam widths while still utilizing existing eight port architecture which is suitable for 8T8R base station radio systems.

This is accomplished by implanting a novel use of integrated beamformers, where the antenna includes 8 columns instead of the typical four columns. Each of the eight columns of elements are connected through a plurality of internal integrated beamformers which are in turn connected to the eight ports at the bottom of the antenna for connection with an eight-port base station radio (See e.g. FIGS. 4 and 6 described in more detail below). Unlike the prior art electronic beam forming antenna in which each column is directly connected to one port of the antenna without any internal beamformers, in the present arrangement, there are a plurality of internal beamformers (e.g. twelve, one beam former per each two rows, for each polarization for an exemplary twelve row antenna) to combine the pattern of columns internally and provide four (4) high gain beams simultaneously at four (4) ports per polarization. Therefore, as shown in FIG. 6 each beam from the beamformers, rather than each column, is connected to the eight ports of radio.

By doing so the gain and beamwidth advantages of having an antenna with eight columns instead of four can be realized using only the basic eight signal ports already available on the standard antenna. Because of the internal integrated beamformers each port now already has a narrow beam (14°-15°) in a specific direction rather than the wide column pattern from the prior art. They also have about 3 dB higher gain (24 dBi) compared to 21 dBi in standard four (4) columns beamformer antennas. Considering the calibration port for calibrating the phase of the beams, different required beam shapes can be formed by further electronic weighting of these beam patterns to make common required beams such as broadcast, boresight and soft split.

To this end a cellular beamforming base station antenna is provided having a reflector, a plurality of signal ports located at the bottom of said reflector, a calibration circuit, a plurality of beamformers, coupled to the signal ports, and a plurality of radiating elements, coupled to the beamformers. The plurality of radiating elements are arranged into a plurality of vertically aligned columns disposed across a width of the reflector, the plurality of radiating elements each also positioned in one of a plurality of horizontally aligned rows along the length of the reflector.

Elements in one of the plurality of rows of elements are connected to at least a first of the plurality of beamformers. Elements in another of the plurality of rows of elements are connected to a second of the plurality of beamformers. Outputs of the first and second beamformers are connected to the calibration circuit which is connected to different ports located on a bottom of the reflector.

BRIEF DESCRIPTION OF THE DRAWINGS

The present invention can be best understood through the following description and accompanying drawings, wherein:

FIGS. 2B1-2B3 are representations of prior art base station signal patterns of FIG. 2A after additional signal weighting;

FIG. 8 is a weighting table for applying signal weighting factors to form the patterns shown in FIGS. 7 and 9A-9D, in accordance with one embodiment.

DETAILED DESCRIPTION

Figure 4:
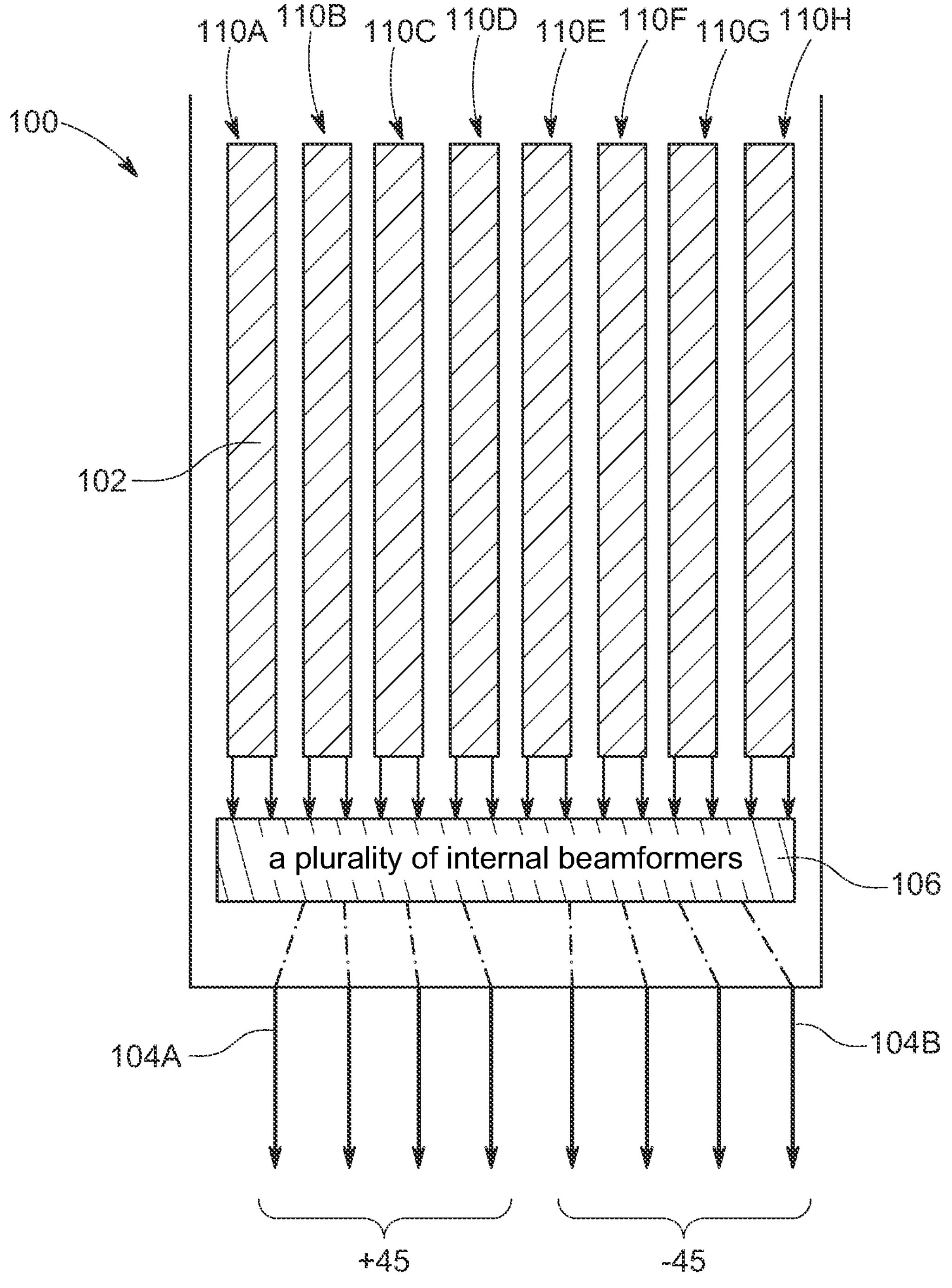
FIG. 4 is schematic of an eight column eight port cellular base station antenna, in accordance with one embodiment.

In one embodiment of the present arrangement as shown in schematic FIG. 4 an antenna 100 is provided with eight columns of elements 102 (labeled 110A-110H), ultimately receiving signals from eight separate signal ports 104A and 104B (half+45° and half −45°). Antenna 100 further includes a collection of integrally located beamformers 106 interposed between the input/outputs of elements 102 and signal ports 104A/104B. An illustration of an exemplary antenna 100 is shown and described in more detail in FIGS. 5A-5E.

Figure 5A:
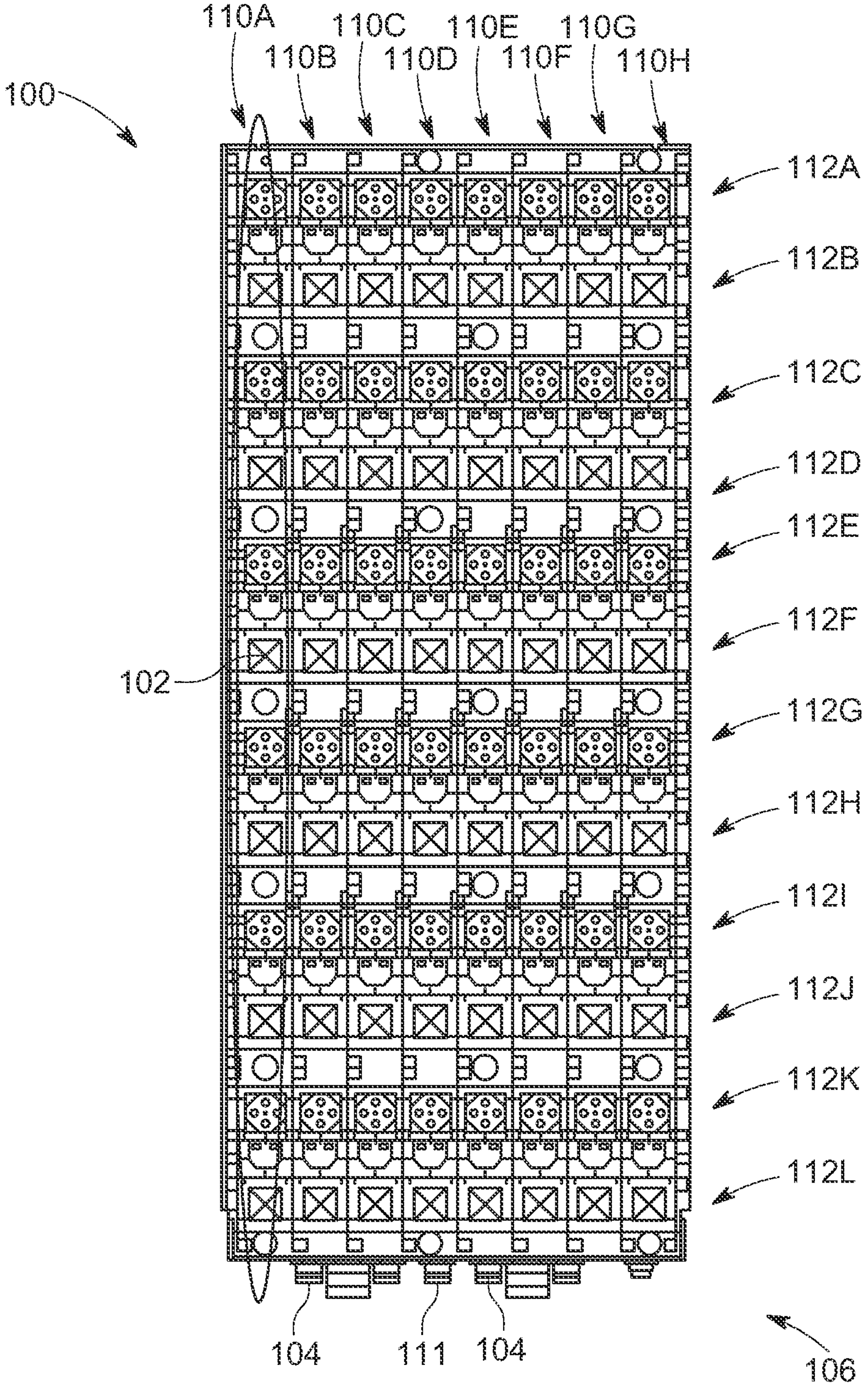
FIG. 5A is an image of an eight column eight port cellular base station antenna, in accordance with one embodiment.
Figure 5B:
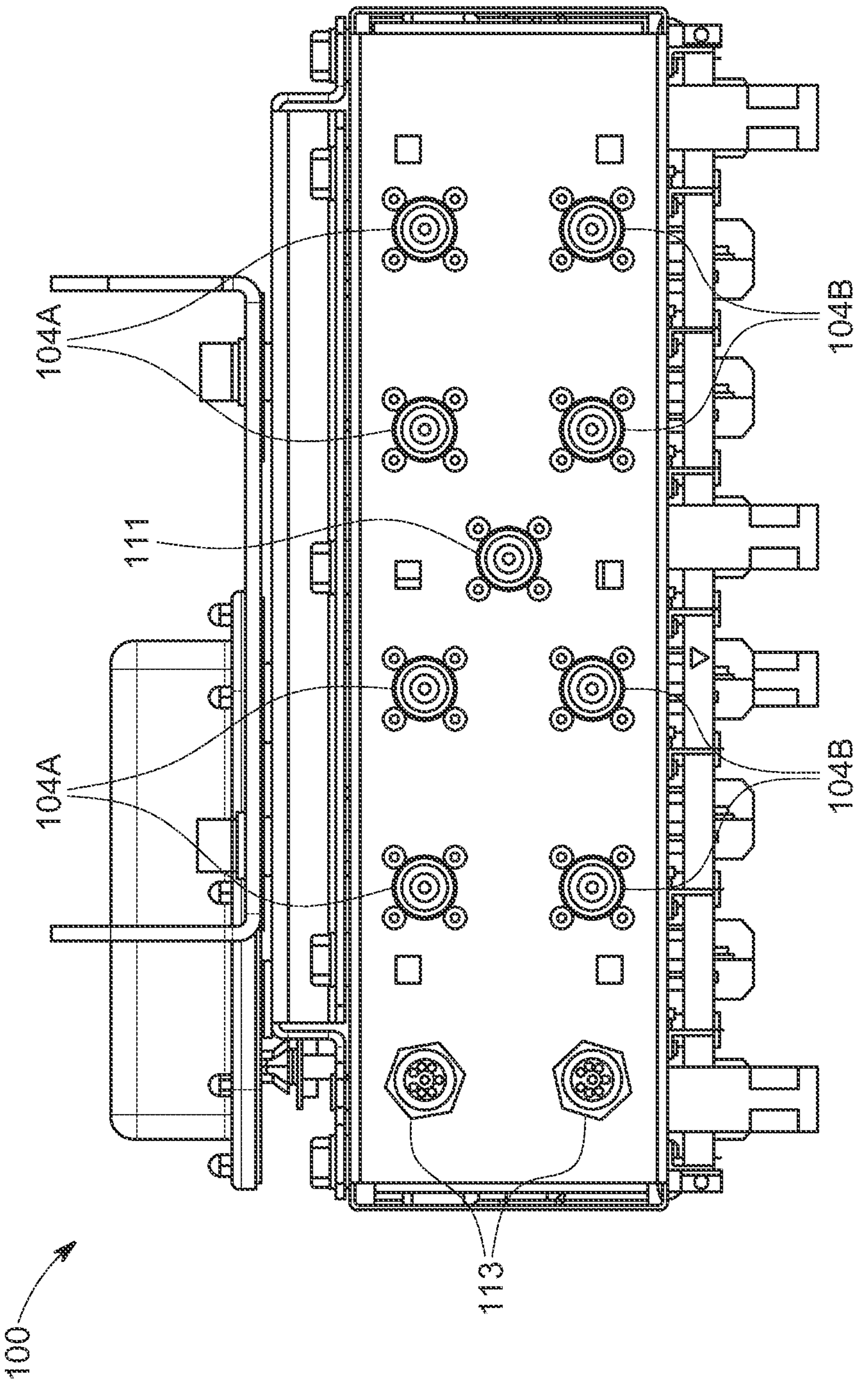
FIG. 5B is bottom view of the eight column eight port cellular base station antenna of FIG. 5A, in accordance with one embodiment.
Figure 5C:
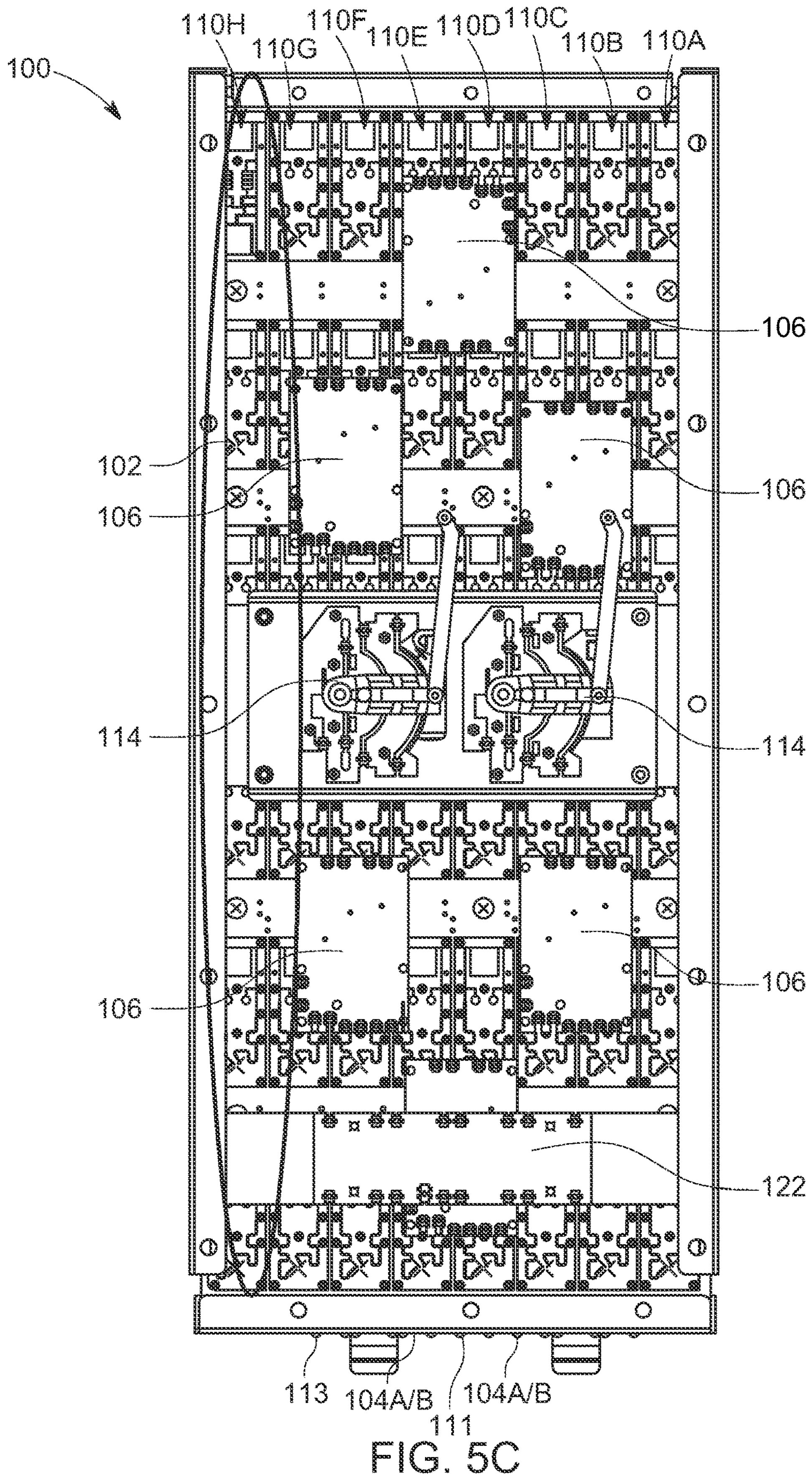
FIG. 5C is back view of the eight column eight port cellular base station antenna of FIG. 5A, in accordance with one embodiment.

For example, FIG. 5A shows a first exemplary configuration of a proposed antenna 100, similar to the schematic diagram of FIG. 4. FIG. 5B shows the bottom of antenna 100 and FIG. 5C shows the back side of antenna 100. As shown in FIG. 5A, each one of the columns of elements 102 (numbers 110A-110H) are made up of a plurality of radiating elements 102 arranged in twelve horizontal rows 112A-

112L. In this exemplary antenna 100, there are ninety-six elements 102. Also in this example, each of elements 102 in any one column 110A-H is an alternating order of one dipole element and then a patch element. However, it is understood that this is just an example, and that any column 110 of antenna 100 may employ the same type of elements 102 through the entire column 110 or other combinations thereof, all with the context of the present signal feeding arrangement through beamformers 106 (see FIGS. 5C and 5D).

FIG. 5B is a bottom view of antenna 100 illustrating the eight signal ports 104 including four ports 104A for +45° polarization and four ports 104B for −45° polarization. Also shown in FIG. 5B is a calibration port 111 for receiving calibration signals to adjust for phase and amplitude error in the RF signals coming from the base stations due to various reasons, as is well known in the art, and two RET (Remote Electronic Tilt) ports 113 for electronically tilting the beam up and down as is also well known in the art.

Figure 5D:
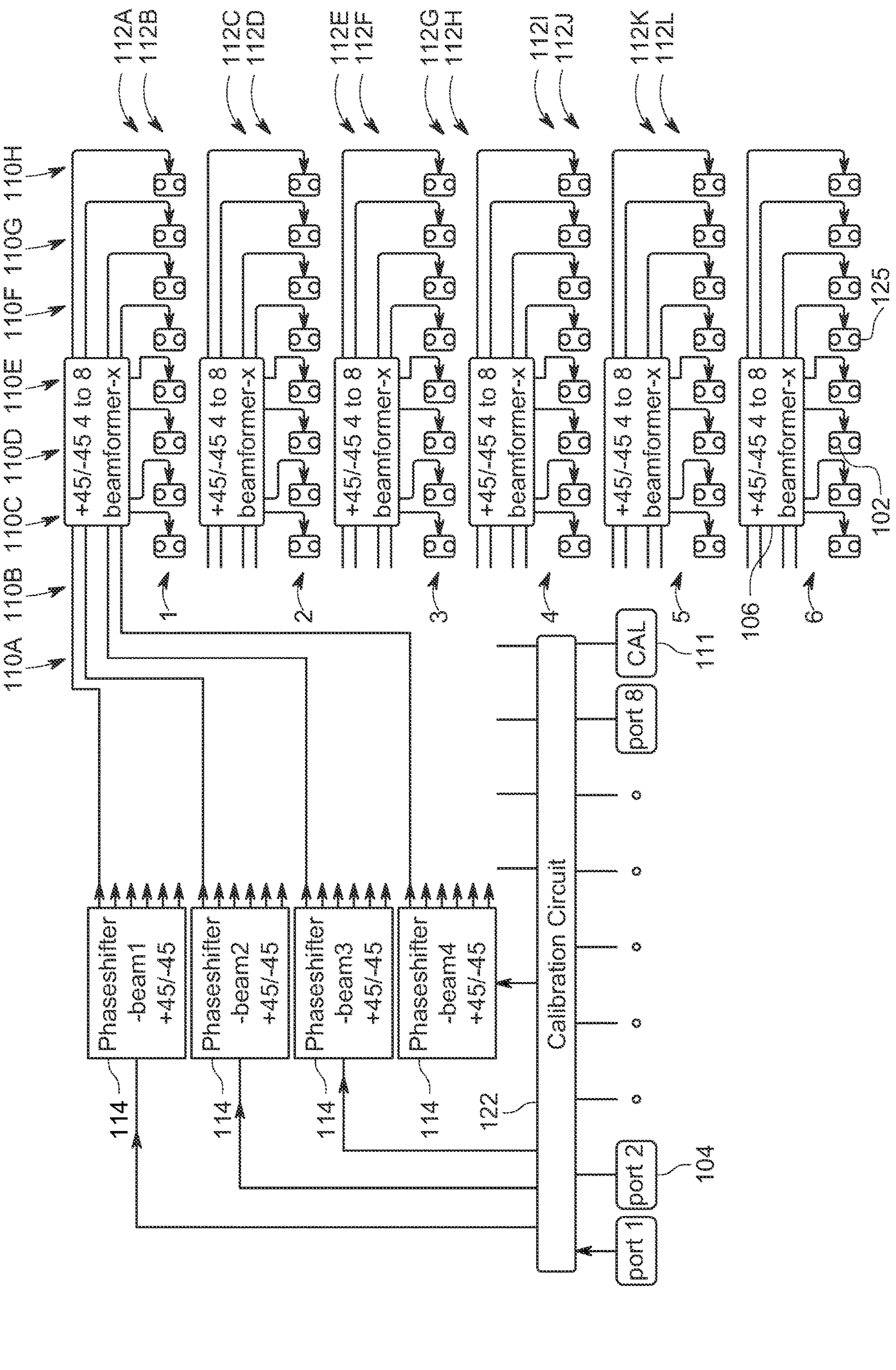
FIG. 5D is connection scheme for the elements and components of the eight column eight port cellular base station antenna of FIG. 5A, in accordance with one embodiment.

FIG. 5C illustrates a back side of antenna 100. In FIG. 5C, antenna 100 is provided with twelve integrated beamformers 106 (six stacks of two—one of which is under the phase shifters shown by arrow point to underside) as well as eight phase shifters 114 (in two stacks of four) and a calibration board 122. Twelve beamformers 106 are connected to elements 102 on one side and to ports 104A and 104B via the eight phase shifters 114 as illustrated in FIG. 5D. Beamformer 106 is for example an N-input, M-output RF circuit which includes splitters, hybrid couplers and transmission lines. By applying an RF signal to each of its inputs, certain phase and amplitudes will be produced on its output ports. These output signals can produce a beam in certain direction when they are fed to M elements located in a straight line. Depending on the design of beamformer 106, elements 102 can be all in same orientation or some of them need to be 180° rotated. The exemplary beamformer 106 used in this design has N=4 and M=8 and explained later in more detail below.

As shown in FIG. 5D, each of two elements 102 in a set of sequential rows (i.e. row 112A and 112B) generate an element pair 125. Each of the eight elements pairs 125 in rows 112A and 112B (eight—one for each of eight columns 110A-110H) are connected to one of beam formers 106. In FIG. 5D, each of beam formers 106 is actually two stacked beam formers 106 one for +45° and one for −45°. The result is that the eight connections from the eight elements pairs 125 from rows 112A and 112B are connected with the eight ports of the of two beamformers 106 (four on the +45° and four on the −45°).

Continuing with FIG. 5D each of the twelve beamformers 106 have inputs which are connected to one of the eight phase shifters 114 (the six +45° beamformers 106 being connected to the four +45° phase shifters 114 and the six −45° beamformers 106 being connected to the four −45° phase shifters 114). In this way all ninety-six elements 102 in all of columns 110A-110H/rows 112A-112L are connected to integral beamformers 106 and then phase shifters 114 in a manner to reduce the required ports to eight ports. For example, as shown in FIG. 5D, each of eight phase shifters 114 are connected through calibration board 122 and then to the eight signal ports 104 located at the bottom of antenna, these eight columns 110 of elements 102 are connected to eight ports 104 with full +/−45° polarity being retained.

Figure 5E:
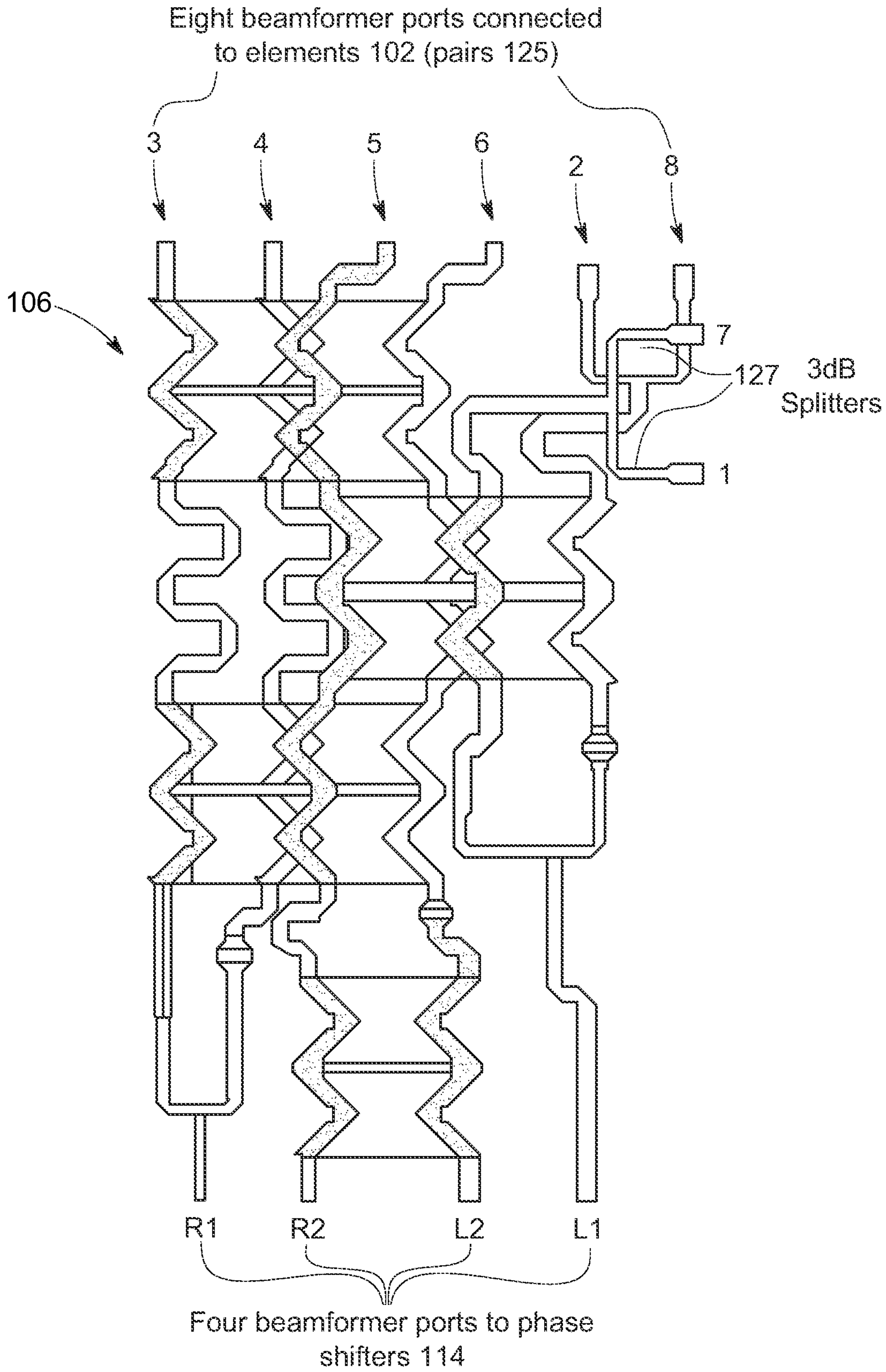
FIG. 5E is an illustration of a splitter arrangement for the eight column eight port cellular base station antenna of FIG. 5A, in accordance with one embodiment.

FIG. 5E, goes along with FIG. 5D to show an exemplary structure of one beamformer 106 to show the eight connection ports to be connected to elements 102 (in eight pairs 125 between two rows (e.g. rows 112A-112B). The four (N=4) to eight (M=8) beamformer as shown in FIG. 5E is configured with a four (4) to six (6) beamformer and two splitters 127. The splitters are used to divide the power equally between column #1 (110A) and #7 (110G) and column #2 (110B) and #8 (110H). Columns #1 and #2 (110A and 110B) are 180° out of phase with columns #3 to #8 (110C-110H) to provide the required phasing for the weighting on elements that make the beams shown in FIG. 7 (described in more detail below).

As noted above in the Summary, FIG. 6 shows the connections between ports 104 of antenna 100 and the 8T8R radio in the base station. Unlike the prior art electronic beam forming antenna in which each column directly is connected to the one port of the antenna without any internal beamformers, in the present arrangement, there are a plurality of internal beamformers 106 (e.g. twelve, one beam former per each two rows, for each polarization for an exemplary twelve row antenna) to combine the pattern of columns 110 internally and provide four high gain beams simultaneously at four ports per polarization. Therefore, as shown in FIG. 6 each formed beam from beamformers, rather than each column, is connected to the eight ports of radio.

Figure 1A:
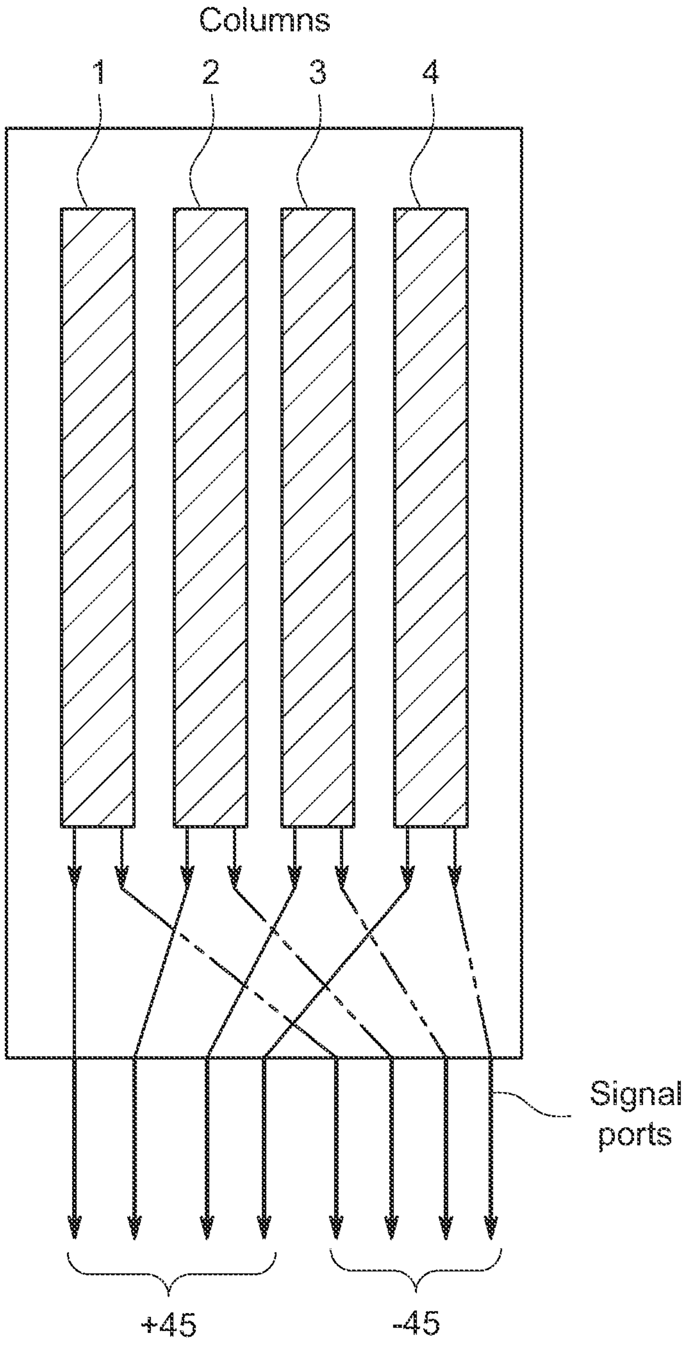
FIG. 1A (PRIOR ART)
FIG. 1A is a schematic of a prior art four column cellular base station antenna.
Figure 1B:
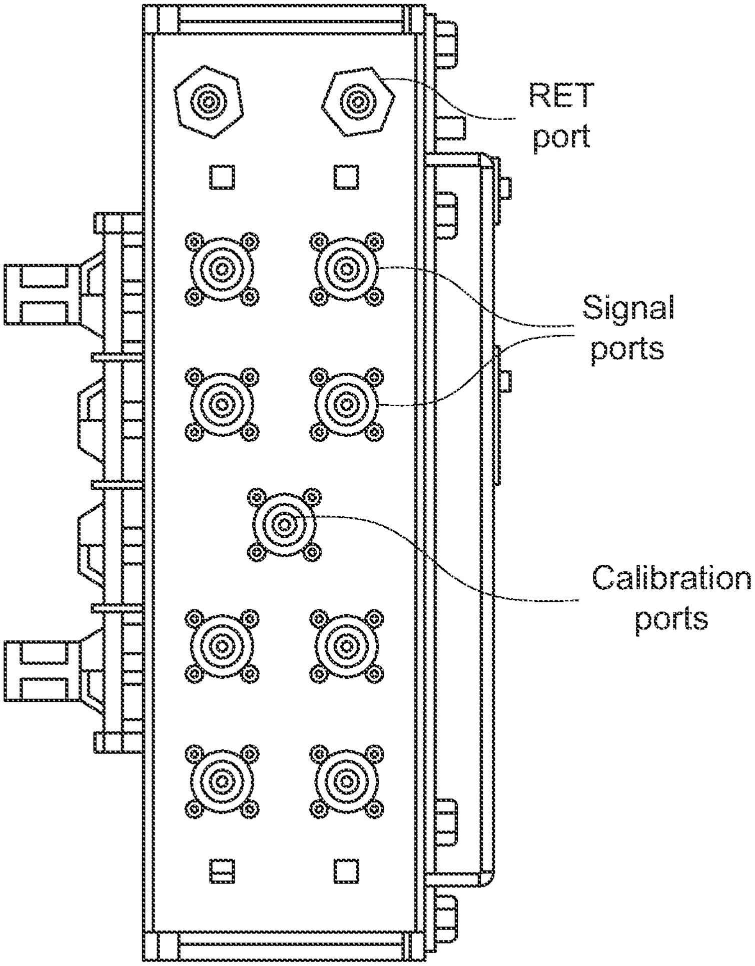
FIG. 1B (PRIOR ART)
FIG. 1B is a bottom view of the prior art antenna of FIG. 1A.
Figure 1C:
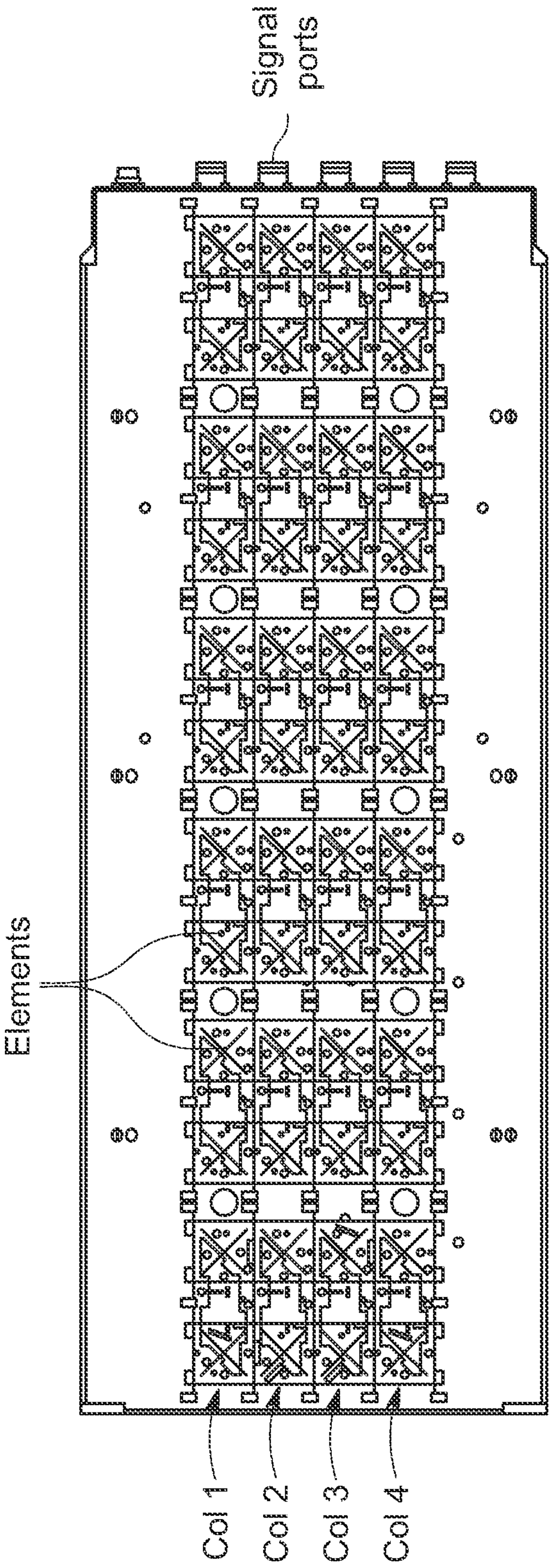
FIG. 1C (PRIOR ART)
FIG. 1C is an image of an exemplary prior art antenna of FIG. 1A.
Figure 1D:
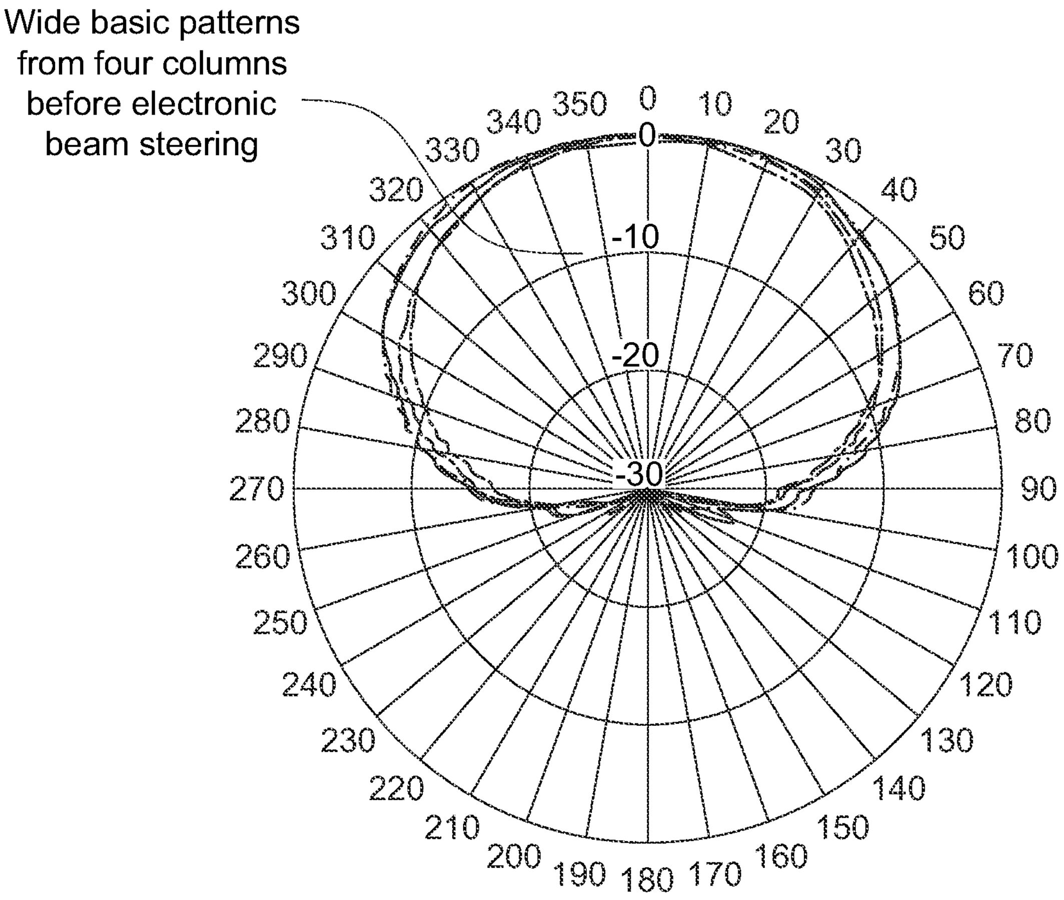
FIG. 1D (PRIOR ART)
FIG. 1D is representation of prior art base signal patterns from prior art antenna of FIG. 1C.
Figure 2A:
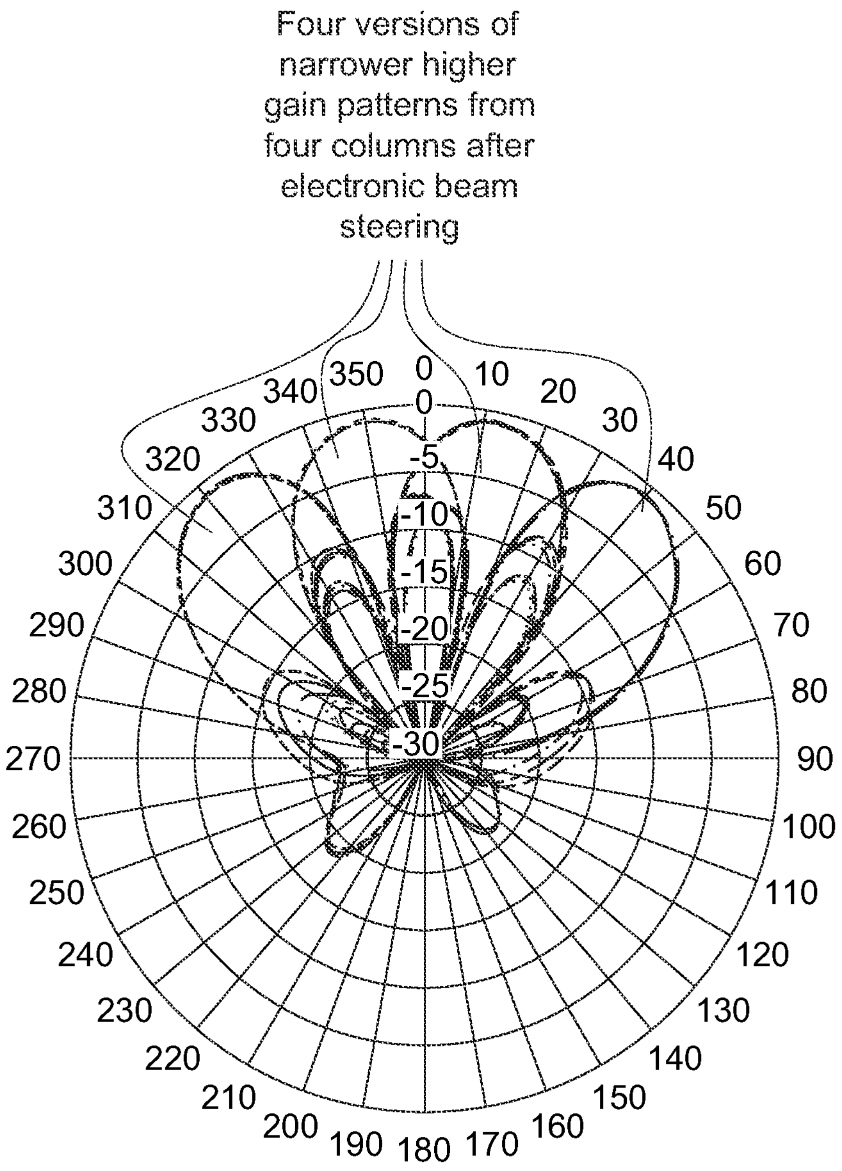
FIG. 2A (PRIOR ART)
FIG. 2A is a representation of prior art base station signal patterns of FIG. 1D, after electronic beamforming.
Figure 6:
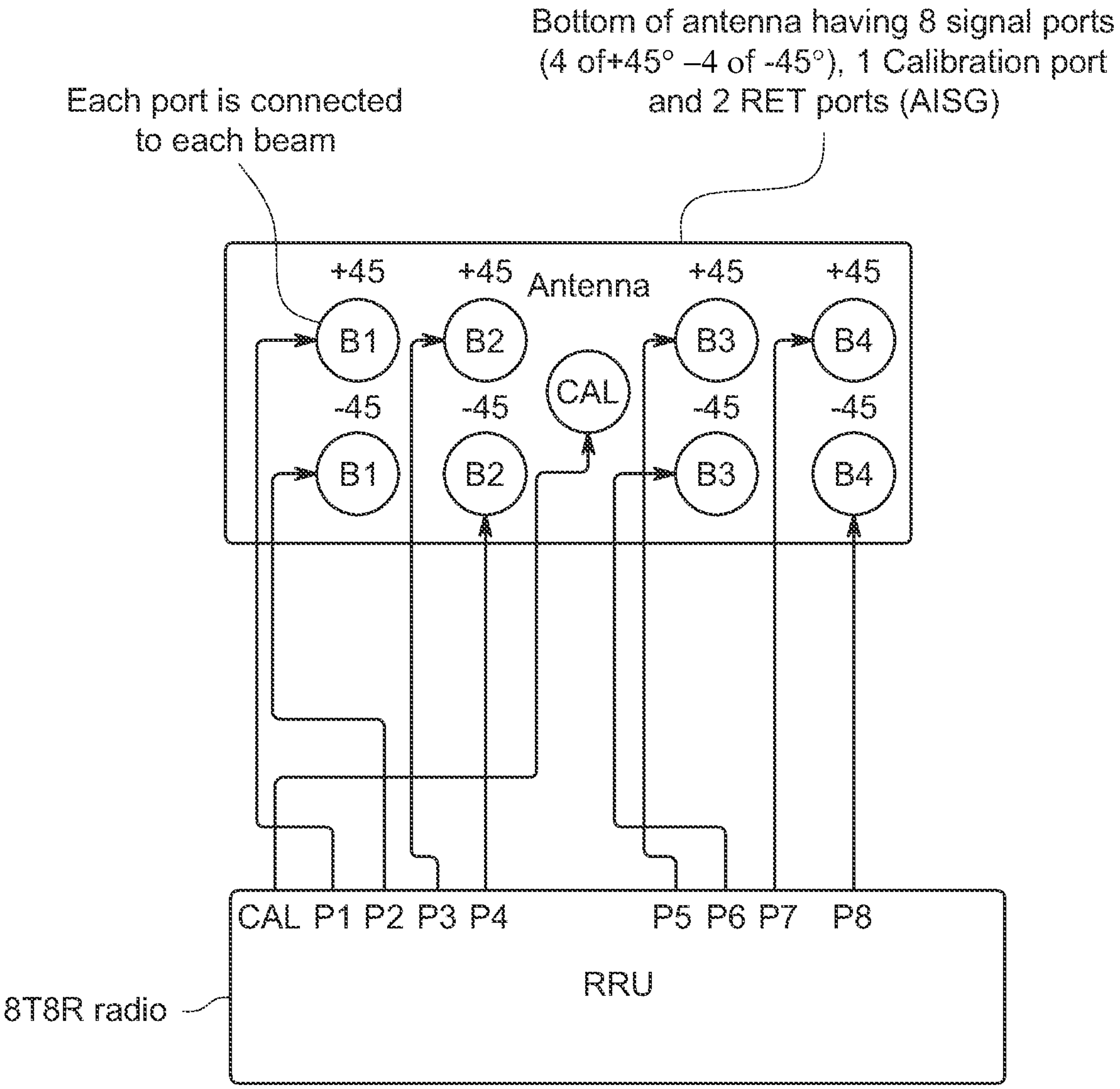
FIG. 6 is a port to radio (RRU) connection schematic for the eight column eight port cellular base station antenna of FIG. 5A, in accordance with one embodiment.

Using this approach as illustrated in FIGS. 5A-5E as well as FIG. 6, the present antenna 100 and associated connection arrangement has the advantage that eight columns 110A-110H can be fed through twelve beamformers 106 and eight ports 104A/B to provide four (4) high gain, dual polarized, and narrow beamwidth beams. This is done simultaneously without the need for any electronic beamforming performed on the RF signal at the radio end. These beams, shown for example in FIG. 7, have 14-15° beamwidth and gain of 24 dBi which is 3 dB more than what can be obtained by four (4) columns beamforming of FIG. 2A. As another advantage these beams can be all present simultaneously, while the beams in FIG. 2A can only be present one at a time and not altogether. These high gain beams are then used as the basis functions for shaping other required beams (see e.g. FIGS. 9A-9D below). This is at odds with prior art FIG. 1D where the raw pattern from the four-column antenna of FIG. 1A before electronic beamforming at the RF signal level is just a basic wide width low gain pattern.

For the purposes of illustrating the exemplary weighting of the elements 102, applied by beamformers 106 the following table is provided:

| | | | | | | | | | |
|---|---|---|---|---|---|---|---|---|---|
| Beam1 (29 left) | Amp(V) | 0.707 | 0.707 | 1 | 1 | 1 | 1 | 0.707 | 0.707 |
| | Phase(deg) | 0 | 90 | 180 | 270 | 360 | 450 | 540 | 630 |
| Beam2 (10 left) | Amp(V) | 0.707 | 0.707 | 1 | 1 | 1 | 1 | 0.707 | 0.707 |
| | Phase(deg) | 0 | 30 | 60 | 90 | 120 | 150 | 180 | 210 |
| Beam3(10 right) | Amp(V) | 0.707 | 0.707 | 1 | 1 | 1 | 1 | 0.707 | 0.707 |
| | Phase(deg) | 0 | −30 | −60 | −90 | −120 | −150 | −180 | −210 |
| Beam4(29 right) | Amp(V) | 0.707 | 0.707 | 1 | 1 | 1 | 1 | 0.707 | 0.707 |
| | Phase(deg) | 0 | −90 | −180 | −270 | −360 | −450 | −540 | −630 |

The amplitude and phase of the weightings of each of the elements produced by beamformers 106 in terms of voltage (V) and deg are in the table above, and in consideration of 180° phase due.

It is noted that these weights are by example and other variations may be implemented within the context and scope of the present invention.

As explained in more detail below from these basic beam patterns of FIG. 7, formed using the integrated beamformers 106, with additional electronic beam forming, various shaped beams can be further formed. In other words, by increasing to eight columns 110 of elements 102, passed through integral beamformers 106 narrower beamwidths are possible than with prior art four column approaches, and higher gain, without the need to increase the number of ports 104 and while still using existing 8T8R eight port radio systems.

Examples of specific weighting factors applied to the RF frequencies applied to port 104 are shown in the table of FIG. 8 (four different options) to produce the desired beams shown in Exemplary patterns 9A-9D corresponding to each of the options.

In the first option, the bottom eight rows of the table in FIG. 8 show zero adjustments to the RF signals to the eight ports 104A/104B. Such a basic arrangement would produce the signal pattern(s) as shown in FIG. 9A. As noted above, because of the integrated beamformers 106 and the use of eight columns 110 of elements 102 instead of the four-column approach of the prior art these beam patterns can achieve a superior beamwidth of 14-15 deg and again maximum of 24 dB. This is all possible using typical eight port 8T8R base station radios.

Figure 7:
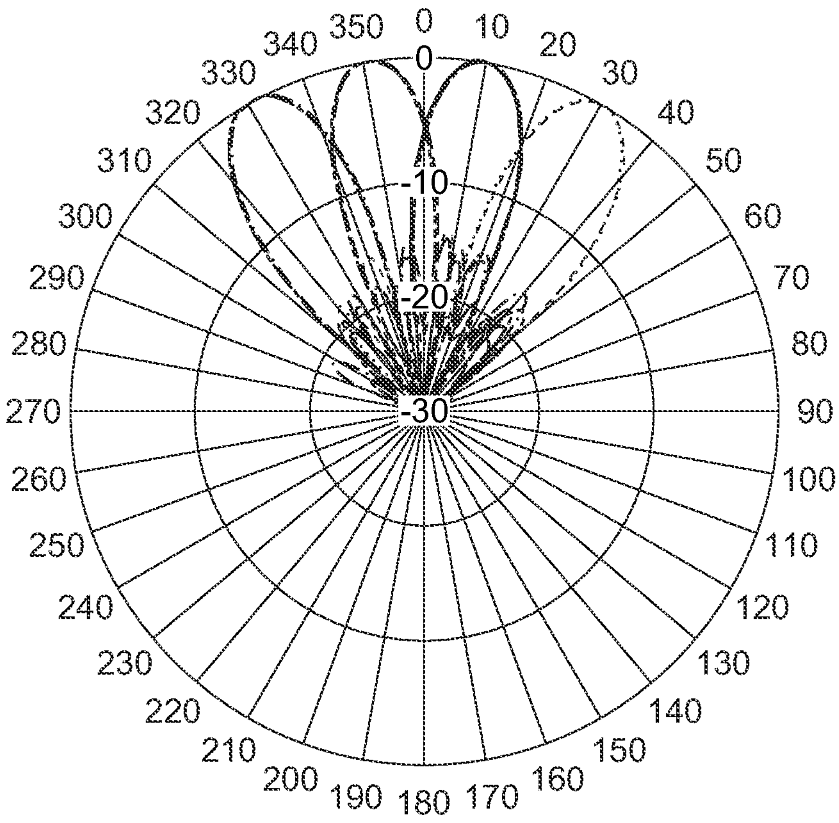
FIG. 7 illustrates four simultaneous patterns (+45/−45) produced at output ports of the eight column eight port cellular base station, in accordance with one embodiment.
Figure 9B:
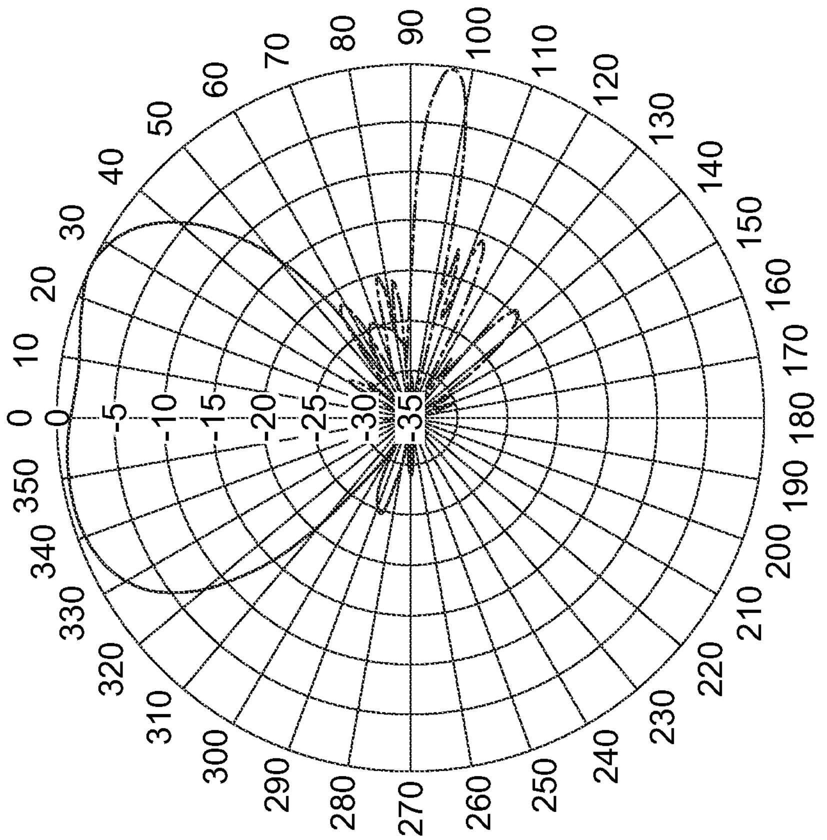
FIGS. 9A-9D illustrate different available patterns from the base pattern of FIG. 7, when applying the signal weighting factors as shown in FIG. 8, in accordance with one embodiment.
Figure 9A:
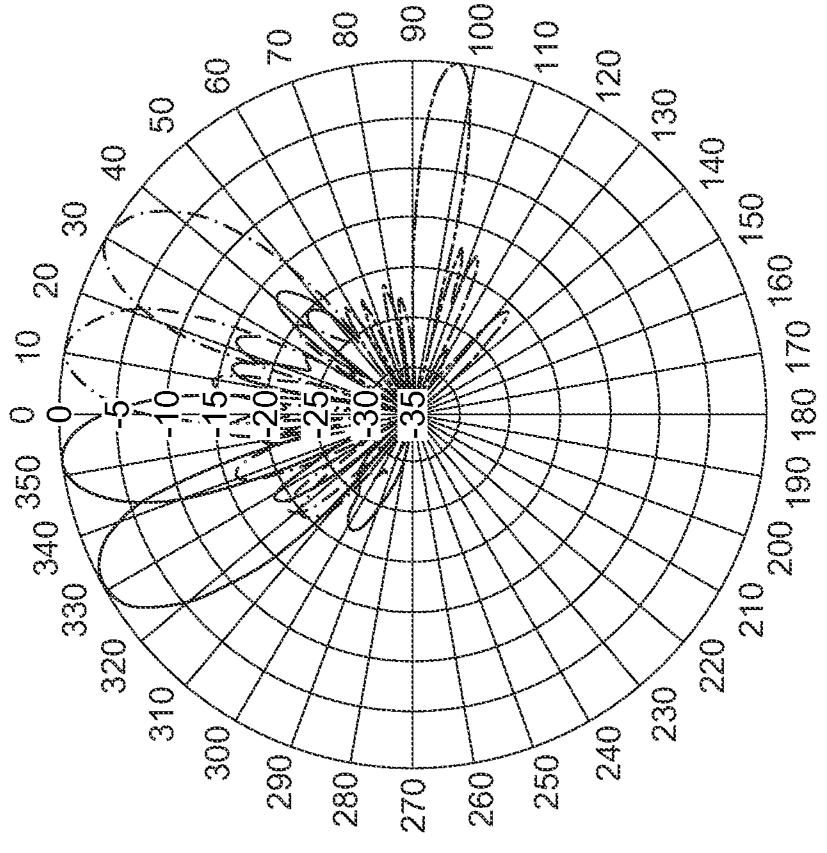

In another option, the top row and fifth row of the table in FIG. 8 show electronic weighting factors applied to the base signal pattern(s) from FIG. 7 to provide a broadside pattern such as that shown in FIG. 9B. This weighting setting would be used when broadcasting signal to the full sector is required and has the azimuth beam width of around 65° and gain of around 18 dBi. This can be compared to broadcast beam of a four column beamformer in FIG. 2B which has a good match.

Figure 9C:
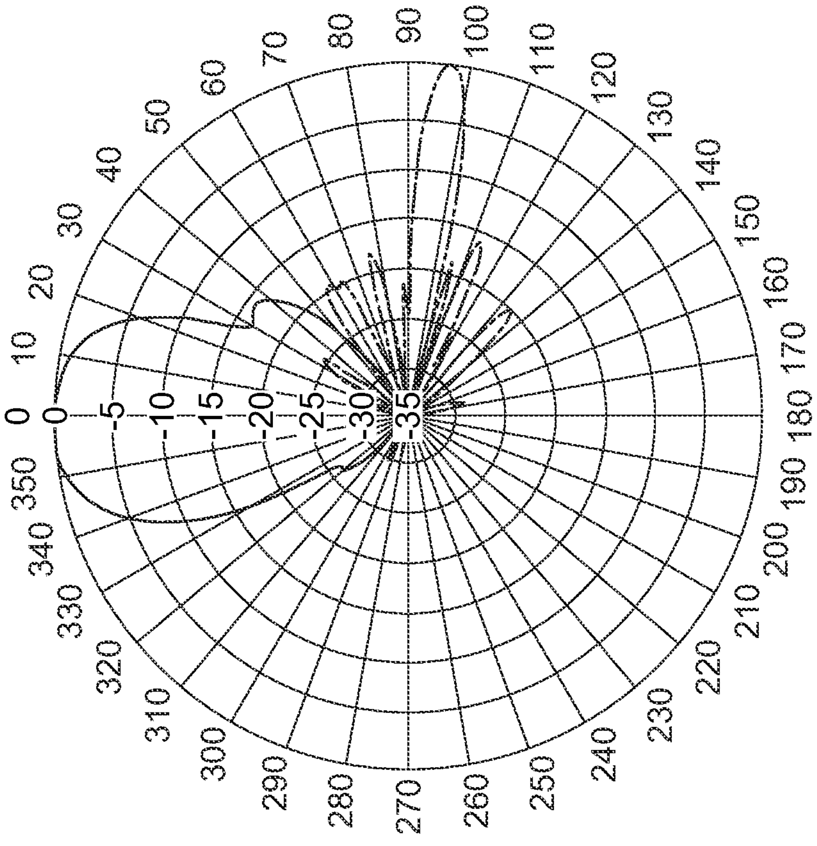

In another option, the second row and sixth row of the table in FIG. 8 show electronic weighting factors applied to the base signal pattern(s) from FIG. 7 to provide a boresight pattern such as that shown in FIG. 9C. This is a boresight pattern with medium gain about 20.5 dB and azimuth BW about 30° and is comparable with boresight pattern of FIG. 2B.

Figure 3A:
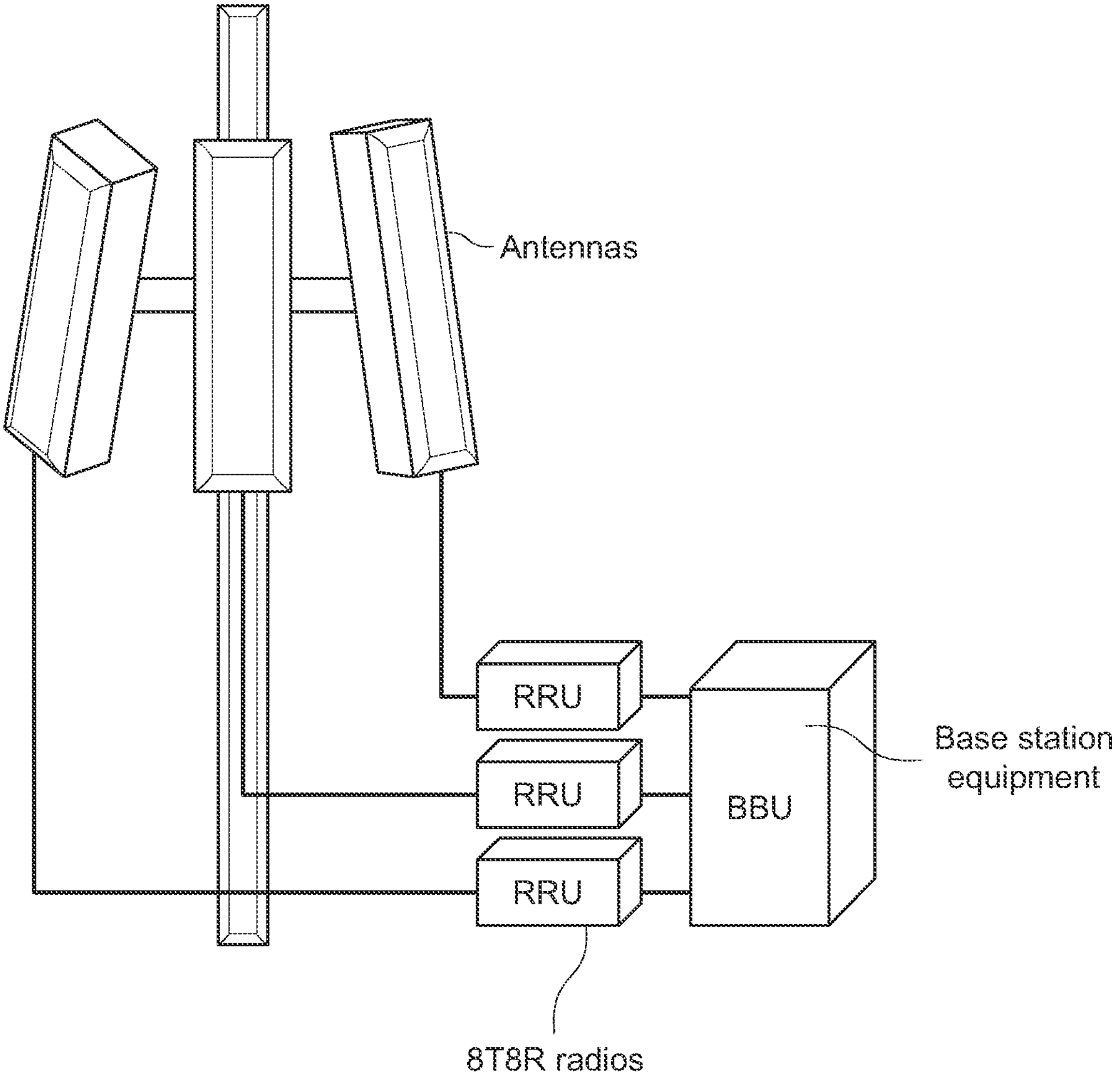
FIG. 3A (PRIOR ART)
FIG. 3A is a prior art connection between the prior art antennas of FIG. 1B and the RRUs in the base station.
Figure 3B:
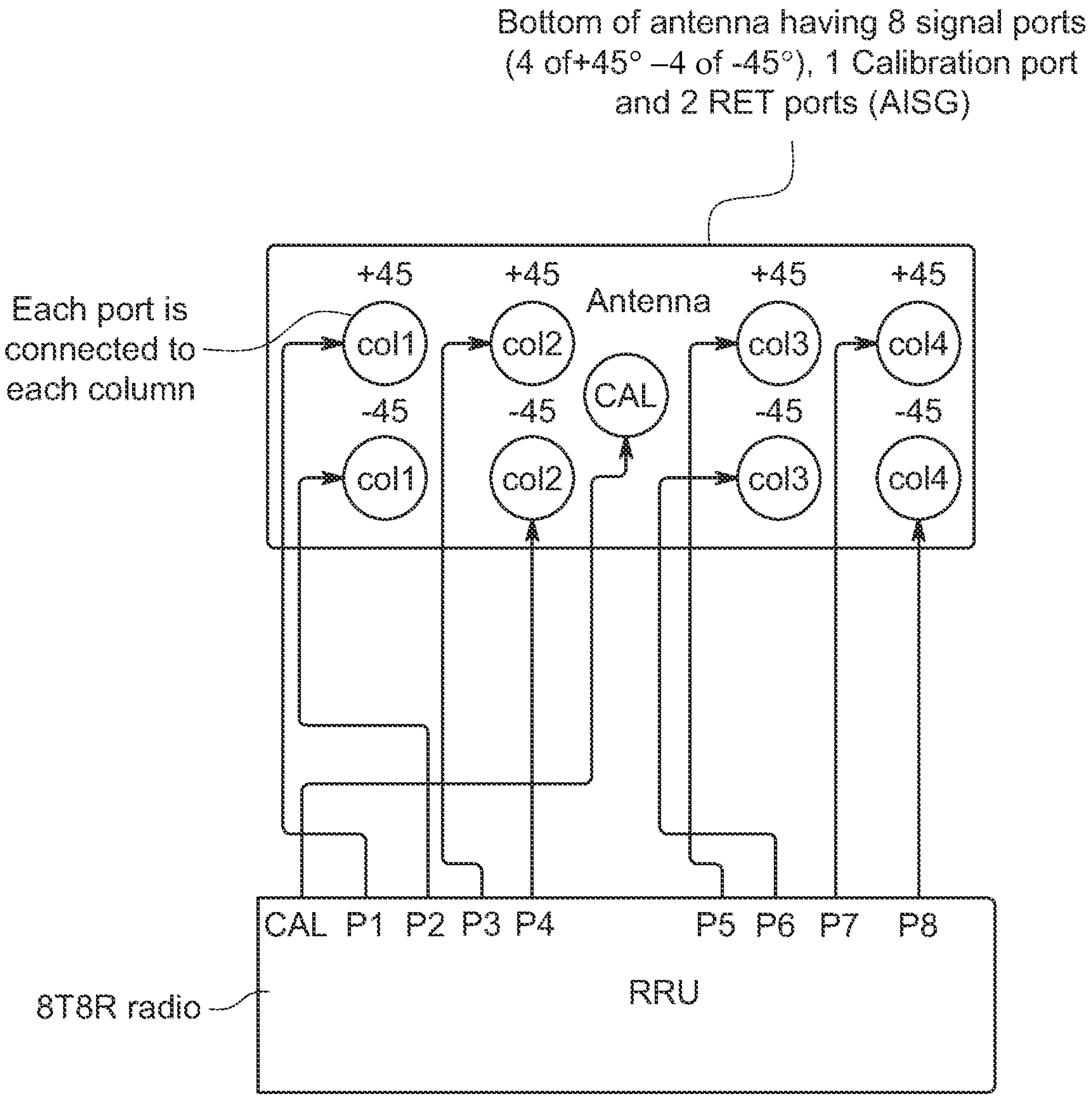
FIG. 3B (PRIOR ART)
FIG. 3B is schematic of the port connections between FIG. 1B and the RRUs of FIG. 3A.
Figure 9D:
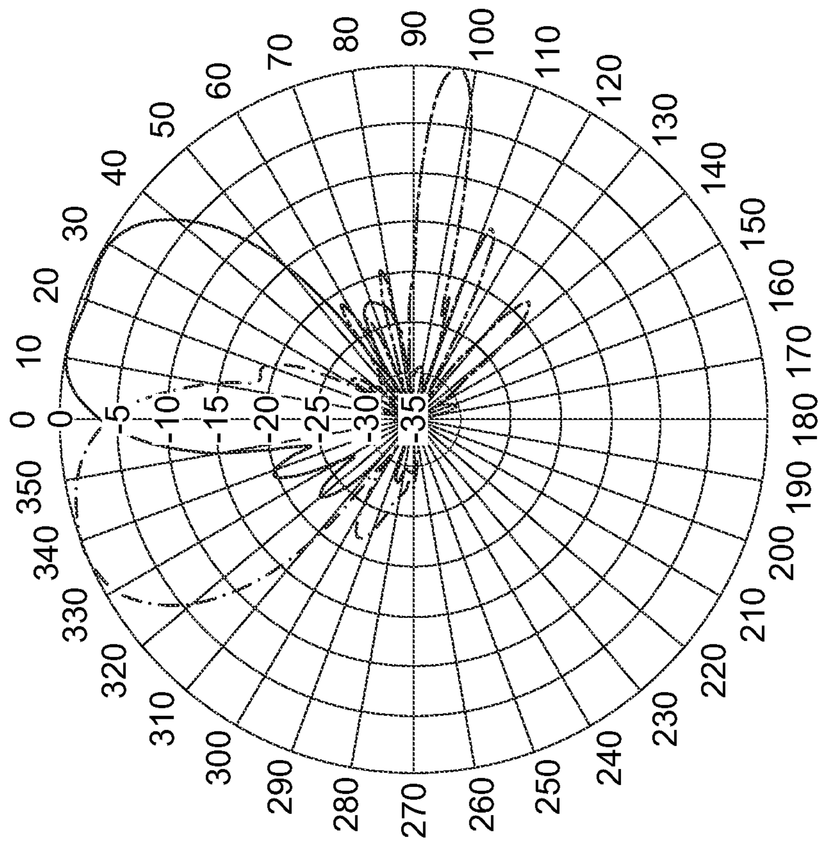

In another option, the third and fourth rows and seventh and eight rows of the table in FIG. 8 show electronic weighting factors applied to the base signal pattern(s) from FIG. 7 to provide a soft-split pattern such as that shown in FIG. 9D. This figure shows both soft split beams (Left and right) achievable by this beamformer. These beams have 20.5 dBi gain with 31° beamwidth and have lower SLL (SideLobe Level) and better asymmetrical shape compared to the soft split beam shown in FIG. 2B3. As can be seen SLL level is lower and also the edge of the beams have a fast roll off in 9D.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A cellular beamforming base station antenna comprising:

a reflector for supporting a plurality of radiating elements on a front side thereof;

said plurality of radiating elements are arranged into a plurality of vertically aligned columns disposed across a width of said reflector, said plurality of radiating elements each also being positioned in one of a plurality of horizontally aligned rows along the length of said reflector;

a plurality of beamformers located on the back of said reflector having outputs that are connected to said plurality of radiating elements on the front side of said reflector, such that elements in any one of said plurality of rows of radiating elements are connected to at least one of said plurality of beamformers and radiating elements in another one of said plurality of rows are connected to another one of said plurality of beamformers, each of said beamformers having a plurality of input ports for receiving an RF signal to excite a beam from said cellular base station antenna, wherein said inputs of said plurality of beamformers are connected to a plurality of phase shifters, and then in turn to a calibration circuit which are in turn connected to signal ports located on a bottom of said reflector, wherein the RF signals from said signal ports pass through the said calibration circuit and said phase shifters before connecting to said inputs of said beamformers on said reflector, such that said cellular beamforming base station antenna produces a high gain beam pattern in certain directions and polarizations, without the need for any electronic beamforming.

2. The cellular base station antenna as claimed in claim 1, wherein said plurality of radiating elements are arranged in eight vertically aligned rows.

3. The cellular base station antenna as claimed in claim 2, wherein said plurality of radiating elements are arranged in twelve horizontally aligned rows.

4. The cellular base station antenna as claimed in claim 3, wherein said cellular base station antenna maintains twelve integral beamformers on the back of said reflector.

5. The cellular base station antenna as claimed in claim 4, wherein all of the plurality of radiating elements in a first two of said twelve horizontally aligned rows are connected to a first two of said twelve integral beamformers.

6. The cellular base station antenna as claimed in claim 5, wherein all of the plurality of radiating elements in in the remaining ten rows are connected, in pairs of two rows, to each of the remaining ten beamformers respectively.

7. The cellular base station antenna as claimed in claim 6, eight connections from eight element pairs from said first two of said twelve horizontally aligned rows are connected with eight ports of said first two beamformers (four on the +45° and four on the)−45°.

8. The cellular base station antenna as claimed in claim 7, wherein inputs of six of said plurality of beamformers are connected to outputs of four of said phase shifters phase shifters.

9. The cellular base station antenna as claimed in claim 8, wherein inputs of said four phase shifters are connected to outputs of said calibration circuit.

10. The cellular bases station antenna as claimed in claim, 9 where inputs of said calibration circuit and a calibration port are attached to nine ports located at the bottom of said reflector.

11. The cellular base station antenna as claimed in claim 9, further comprising splitters to divide power equally between radiating elements in a first vertical column and a seventh vertical column, as well as between said radiating elements in a second of said vertical columns and an eighth of said vertical columns.

12. The cellular base station antenna as claimed in claim 9, wherein the radiating elements of first and second vertical columns are 180° out of phase with the radiating elements of third through eighth of said vertical columns providing phasing for the weighting on said radiating elements.

13. The cellular base station antenna as claimed in claim 1, wherein said outputs of said plurality of beamformers, connected to signal ports located on a bottom of said reflector, output beamformed signals to input ports of a connected RRU (Remote Radio Unit).

14. The cellular base station antenna as claimed in claim 1, wherein said signal ports located on the bottom of said reflector each output a narrow beam, approximately 14°-15° and at gain of approximately (24 dBi).

15. The cellular base station antenna as claimed in claim 1, wherein said radiating elements in said plurality of said vertical columns are connected to said plurality of beamformers in a manner to provide four high gain beams simultaneously at four ports, per polarization, at the bottom of said reflector.

16. The cellular base station antenna as claimed in claim 1, wherein electronic weightings are applied to base signal pattern from said signal ports on said antenna to provide a broadside pattern with an azimuth beam width of approximately 65° and gain of around 18 dBi.

17. The cellular base station antenna as claimed in claim 1, wherein electronic weightings are applied to base signal pattern from said signal ports on said antenna to provide a boresight pattern with medium gain of approximately 20.5 dBi and azimuth beam width of approximately 30°.

18. The cellular base station antenna as claimed in claim 1, wherein electronic weightings are applied to base signal pattern from said signal ports on said antenna to provide a soft-split pattern (Left and right) where the beams have 20.5 dBi gain with 31° beamwidth and have low SLL and asymmetrical shape.

* * * * *